Nov. 11, 1969 J. O. SCHAEFER 3,478,196

DATA ENCODER

Filed Oct. 11, 1965 4 Sheets-Sheet 1

INVENTOR

JOHN O. SCHAEFER

BY Edward S. Gershuny

AGENT

United States Patent Office 3,478,196
Patented Nov. 11, 1969

3,478,196
DATA ENCODER

John O. Schaefer, Lexington, Ky., assignor to International Business Machines Corporation, Armonk, N.Y., a corporation of New York Filed Oct. 11, 1965, Ser. No. 494,453
Int. Cl. G06k *1/00, 3/00*
U.S. Cl. 235—61.6 9 Claims

ABSTRACT OF THE DISCLOSURE

This invention relates to a data encoder activated by a keyboard and having a plurality of coding strips responsive to the keyboard and generating coding representations for a depressed key on the keyboard. The coding strips are engaged by a interposer which in combination with the engaging holes in the coding strips allows the interposer to positively displace selected ones of the coding strips while not displacing unselected coding strips are held firmly by a stop member.

This invention relates to data encoders, such as code converters and keyboard controlled paper tape punches, that utilize relatively movable members to control various machine functions. More particularly, the invention relates to a mechanism to control the motion of the movable members.

The Hickerson Patents 2,978,086 for "Key Operated Machines" and 3,044,690 for "Code Converting Mechanism," both of which are assigned to International Business Machines Corporation, show how certain machine functions can be controlled by the motion of a stack of coded relatively movable thin strips. These strips, referred to as "slides," may be used to control a variety of functions such as printing characters on a sheet of paper or punching coded representations of characters into a paper tape or a data card.

Prior to this invention, it was the practice to use springs to push or pull slides that needed to be moved relative to other slides. Movement of a slide in one direction was effected by the force of the spring; movement of the slide in the opposite direction was effected by some mechanical means (e.g., an arm controlled by a solenoid, or a cam) which moved the slide against the force of the spring. This prior practice has proved not to be entirely satisfactory mainly because of problems caused by frictional forces between slides that have motion relative to one another. These frictional forces tend to slow down the relative motion between slides and, in some instances, actually prevent the slides from moving.

Many attempts, none of them entirely successful, were previously made to overcome these problems. One such attempt involved the use of more powerful springs to drive the slides in an attempt to overcome frictional drag. This was unsatisfactory because it necessitated more powerful means to drive the slides when they had to be moved against the force of the spring, resulting, among other things, in increasing the size and the cost of the machine. Another attempt to overcome the problems caused by friction was to coat the slides with a material that has a low coefficient of friction. This did not completely prevent adjacent slides from "sticking" and it therefore was also found to be unsatisfactory. Also, combinations of the above two attempts (i.e., coating the slides and using more powerful springs) did not adequately solve the problems caused by frictional drag.

Therefore, it may be seen that previously used drive means were inadequate because of the problems caused by frictional drag.

It is therefore an object of this invention to drive slides in a keyboard controlled machine or in a code converter in such a manner that frictional drag is no longer a problem.

It is a further object of this invention to provide a single drive means that will perform the dual function of driving selected slides to an operative position and then returning all slides to their initial position.

The foregoing and other objects are realized by the provision of a novel mechanism to control the motion of relatively movable slides. More particularly, the novel mechanism moves selected slides in their forward or reverse direction under control of direct machine drive while non-selected slides are positively detained. This eliminates the customary errors in selection due to "sticking" action of the adjacent slide.

The most important advantage of this invention over the prior art is its dependability. This dependability leads to the further advantage that it is not necessary to build elaborate checking mechanisms into machines embodying the invention; i.e., it is not necessary to check each individual slide in order to know that all of them have responded properly because, in machines utilizing this invention, the porper motion of any one slide indicates that all of the slides have moved properly.

Another advantage of this invention is that selected slides will respond rapidly to actuation and will be quickly moved to their operating position.

Still another advantage of this invention is that it is inexpensive and durable.

Although the invention is useful in many different machines in which slides move relative to one another, preferred embodiments will be described herein showing the invention in a keyboard controlled machine and in a paper tape controlled code converter.

The foregoing and other objects, features, and advantages of the invention will be apparent from the following more particular description of preferred embodiments of the invention as illustrated in the acccompanying drawings.

Figure 1:
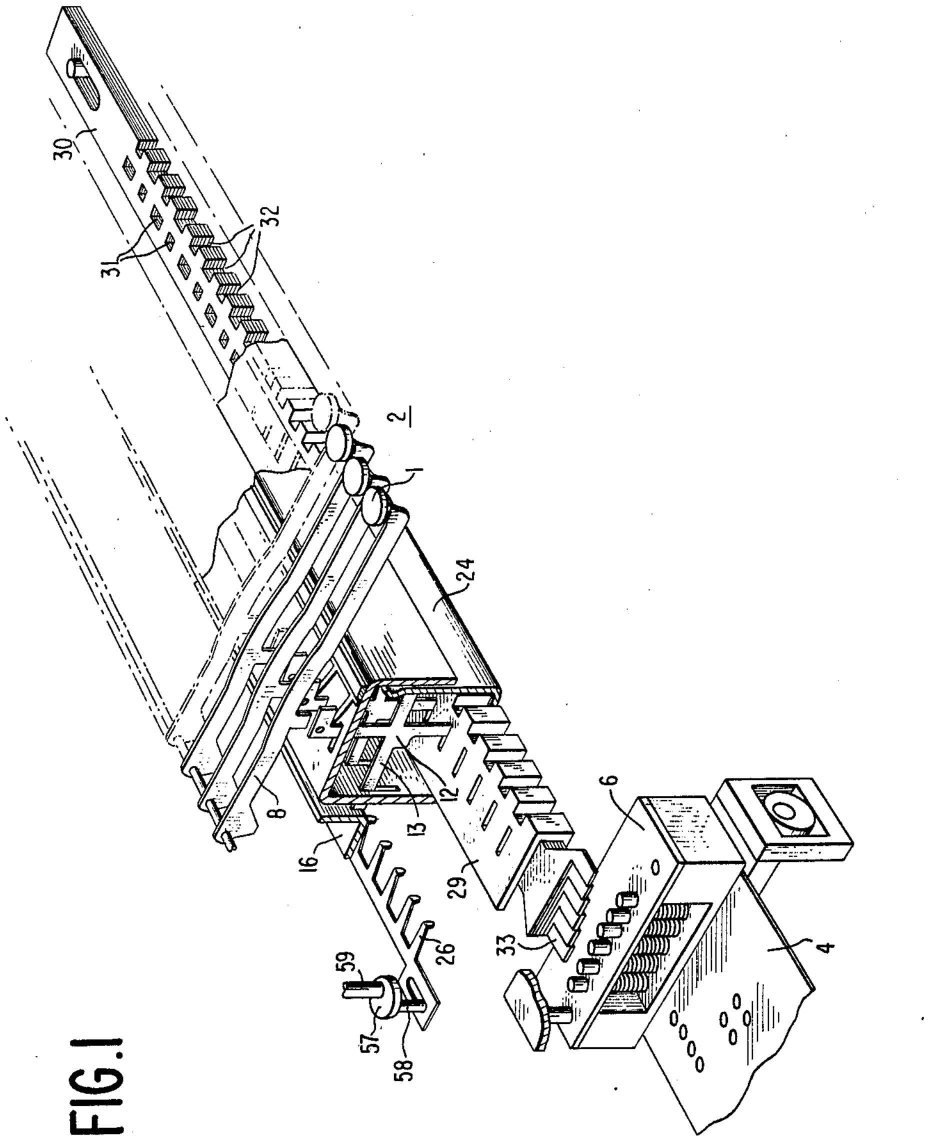
FIG. 1 is a perspective view of a keyboard controlled machine embodying the invention.

Referring first to FIG. 1, there is shown a keyboard controlled machine embodying this invention. This device is of the type described in the Hickerson Patent 2,978,086 and reference is made to that patent for a more complete description of certain details of the device than will be included herein. Each key 1 on the keyboard 2 serves as an actuating means for causing different machine functions. For example, actuation of one key might cause the character "A" to be punched into an output paper tape 4, while actuation of another key might cause a space to be left on the paper tape. It will be clear to those skilled in the art that many other kinds of actuating means (e.g., telegraph signals, paper tape, punched cards, etc.) could be used in place of the keys shown in FIG. 1. Actuation of a key 1 causes actuation of a key lever 8 as will be hereinafter described in more detail.

Figure 2:
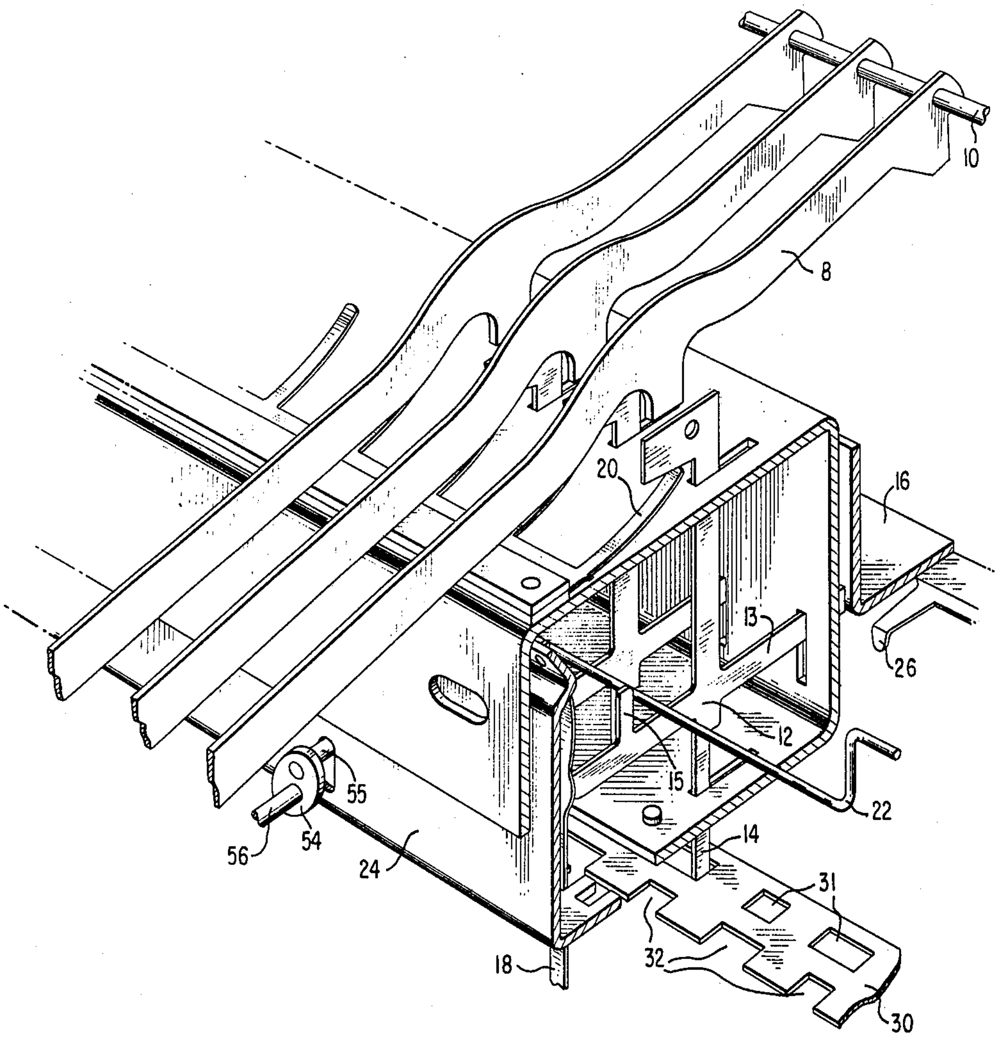
FIG. 2 shows the invention in greater detail.

Referring now to FIG. 2, component parts of the novel mechanism can be more clearly seen. The actuating means is here represented by the key lever 8 which pivots downward about a pivot support 10 when its associated key is actuated. Associated with each key lever 8 is a stop member 12 which will move downward against the force of a spring 20 in response to the downward motion of its associated key lever. The stop member 12 will move downward until its horizontal arm 13 is below the level of a keeper 16. Associated with each stop member 12 is an interposer 18. After the stop member 12 moves downward, its associated interposer 18 will push the stop member to the rear until the horizontal arm 13 of the stop member is held under the keeper 16. As the stop member 12 moves to the rear, a vertical arm 15 of the stop member will trip the cycle clutch (not shown) of the machine through a bail 22 to cause the machine to begin cycling. A clutch that may be used for this purpose is described in the "IBM ET Customer Engineering Series 72 Instruction Manual" (pp. 29–43), Form No. 241–5032-O, copyright 1961 by International Business Machines Corporation.

Each stop member 12 has a detent portion 14 which is receivable in a group of aligned stop openings 31 in a stack of slides 30. The slides are normally stacked in superposed relationship and are supported and retained within a channel member 29 (shown in FIG. 1). (For the sake of clarity, only one slide is shown in FIG. 2, although a plurality of slides will generally be required.) Also, each interposer 18 is receivable in a group of aligned engaging openings 32 contained in the slides. There is also provided a drive means, comprising a carrier unit 24 and associated means to apply power thereto, which responds to the actuation of the clutch by moving all of the interposers 18 to the right.

Returning to FIG. 1, there is shown an output punch unit 6 which is responsive to the movement of selected slides to punch a coded representation of a character into the output paper tape 4. The punch unit 6 is only one example of character means that may be used to produce a manifestation of the actuating means that was actuated. A printing mechanism and a card punching mechanism are examples of other character means that could equally well be used.

Referring to FIG. 1, each slide 30 is provided with an extension 33 which cooperates with the output punch unit 6 to cause an output paper tape 4 to be punched with a coded representation of the character corresponding to the key button that was actuated. An example of a punch unit that punches characters in response to the motion of selected slides is described in detail in U.S. Patent 2,978,086.

Returning to FIG. 2, it may be seen that there is also provided a restore bail 26 for each interposer 18. By pushing a stop member 12 so that its horizontal arm 13 is released from underneath the keeper 16 at the completion of punching an output character, a restore bail 26 will serve to disengage its associated interposer 18 from the stack of slides 30 and return it to its orginal position. There is also provided a return spring 20 for each member 12 to return the stop member to its original position.

Figure 5:
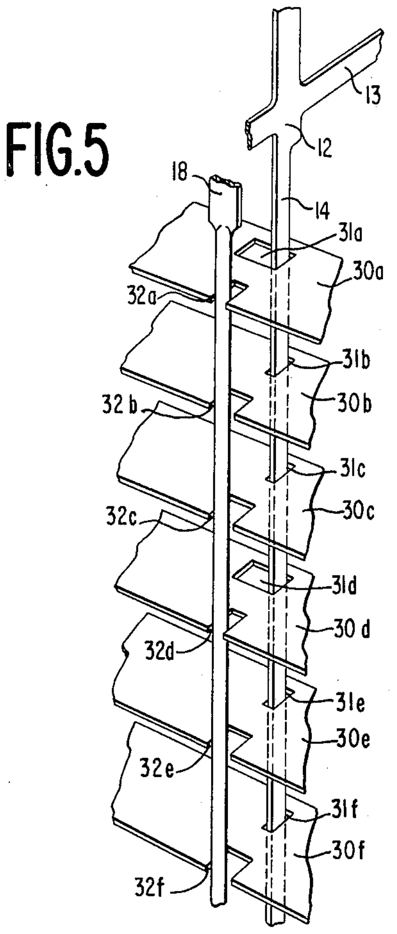
FIG. 5 is a detailed view showing how slides are moved to control punching of an output character.

So that the invention will be completely understood, it is necessary to describe the structure of the slides in detail. Some of the details of a slide 30 are shown in FIG. 2. Each slide 30 has in it a series of stop openings 31 and a series of engaging openings 32. There is one engaging opening associated with each stop opening in a slide. Each stop opening 31 may be either large or small depending upon whether or not movement of the slide is required to represent a given character. Associated with each large stop opening is a small engaging opening; associated with each small stop opening is a large engaging opening. Although only one slide is shown in FIG. 2, it must be remembered that there will generally be a plurality of slides in stacked relation. As shown in FIG. 5, when all slides are in their initial or home positions the right-most edges of all the stop openings 31*a*–31*f* that represent any given character are in vertical alignment, while the left-most edges of the associated engaging openings 32*a*–32*f* are also in vertical alignment.

In order to properly control the punching of a coded representation of a character, some slides must move while others remain stationary. As is shown most clearly in FIGS. 3 through 5, the motion of the slides is controlled by the coaction between an interposer 18 and the detent portion 14 of a stop member 12. In these figures, an interposer 18 is shown after it has entered an engaging opening 32. This position of the interposer is known as its "operative position." Also, in these figures, a stop member 12 is shown after its detent portion 14 has entered into a stop opening 31. This position of the stop member is known as its "operative position." Conversely, an interposer 18 or a stop member 12 that has not moved to its operative position is regarded as being in an "inoperative position." The slides in FIGS. 3–5 are shown in their "initial" or "home" positions; i.e., before they have been moved to control a punch mechanism or other character means.

Figure 3:
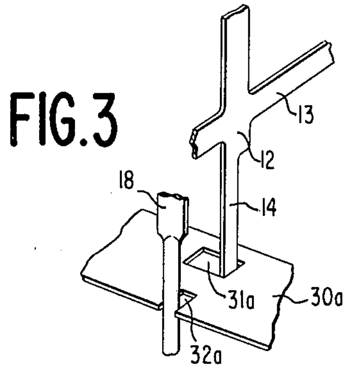
FIG. 3 is a detailed view showing the positions of a stop member and an interposer when a slide is to move.

FIG. 3 illustrates the situation where a selected slide is to be moved. The detent portion 14 of a stop member 12 has entered a large stop opening 31*a* of a slide 30*a*. The interposer 18 associated with the stop member has entered the small engaging opening 32*a* that is associated with the large stop opening 31*a*. The interposer will then be driven in its forward direction (to the right). Since the small engaging opening 32*a* is just large enough to admit the interposer 18, the movement to the right of the interposer will result in the slide also moving to the right. (A slide which has been mover to the right is regarded as being in its "operative position.") The large stop opening 31*a* through which the detent portion 14 of the stop member projects is of sufficient size to permit the slide to move. At the end of the cycle, after printing or punching of a character has occurred, the interposer will be moved in its reverse direction (to the left) back to its initial position and the slide will thereby also be returned to its home position.

Figure 4:
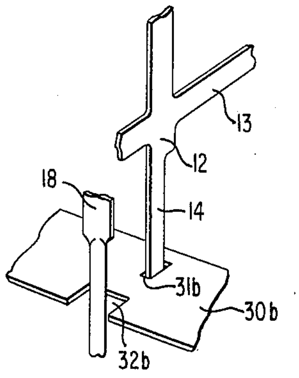
FIG. 4 is a detailed view showing the positions of a stop member and an interposer when a slide is to remain stationary.

FIG. 4 illustrates the situation when a slide is to remain stationary. An interposer 18 and a stop member 12 are shown in their operative positions. In FIG. 4, the detent portion 14 of the stop member has entered a small stop opening 31*b* while the interposer 18 has engaged the associated large engaging opening 32*b*. Since the small stop opening 31*b* is just large enough to admit the detent portion 14 of the stop member 12, the detent portion will prevent the slide from moving. The large engaging opening 32*b* is of sufficient size to permit the interposer 18 to be moved to the right in its forward direction without disturbing the position of the slide 30*b*. When the interposer is moved to the left in its reverse direction back to its initial position at the end of a cycle, the slide will still be in its initial position.

OPERATION

Referring again to FIG. 2, the operation of the invention may be clearly seen. When a key is actuated, a key lever 8 associated with that key will move downward and force an associated stop member 12 to also move downward until a horizontal arm 13 of the stop member is below the level of a keeper 16. At this time, an interposer 18 associated with the stop member 12 will push the stop member to the rear until the horizontal arm 13 is held below the keeper 16. As the stop member 12 moves to the rear, a vertical arm 15 of the stop member will trip the cycle clutch of the machine through a bail 22 to cause the machine to begin cycling. The stop member 12 and the interposer 18 will then both be in their operative positions, the detent portion 14 of the stop member having fallen through a group of aligned stop openings 31 in the stack of slides and the interposer 18 having entered into a group of aligned engaging openings 32 in the stack of slides.

The carrier unit 24 will then be driven to the right, carrying with it all of the interposers. However, only the interposer 18 associated with the stop member 12 that was moved downward in response in actuation of a key will have moved to its operative position and will affect the motion of the slides. Turning to FIG. 5, where portions of six slides **30*a*–30*f* are shown in conjunction with the interposer 18 and the detent portion 14 of the stop member 12, it can be seen that slides 30*a* and 30*d* will move to the right with the interposer, while slides 30*b*, 30*c*, 30*e*, and 30*f*** will remain stationary. This motion of the slides will be explained in greater detail below.

After selected slides have been moved to the right and have been used to control an operation such as printing a character or punching a coded character into a paper tape, the carrier unit 24 will move to the left, carrying with it the interposer 18 to return all slides to their initial position. In this example, the carrier unit 24 functions as a bi-directional drive because it first drives the interposers in a forward direction and then, after completion of punching, it drives the interposers in the reverse direction. Although separate drives could clearly be used for driving the interposers in the two directions, it is preferred that one drive be used to serve this dual purpose. A restore bail 26 will then move forward to engage the horizontal arm 13 of the stop member 12. The restore bail 26 will push the horizontal arm 13 of the stop member out from under the keeper 16 to disengage the interposer 18 and to permit the spring 20 to restore the stop member to its initial position. The machine is now ready for the entry of another character.

Movement of the carrier unit 24 in its forward and reverse direction is controlled by the rotation of cam 54 and shaft 55 about shaft 56 in a manner which is well known to those acquainted with the art to which this invention pertains. Similarly, movement of the restore bail 26 is controlled by the rotation of cam 57 and shaft 58 about shaft 59 (see FIG. 1). The above-mentioned rotating units are atcuated when the cycle clutch of the machine is tripped through bail 22 by the vertical arm 15 of the stop member 12.

In order to further clarify the operation of the invention, the motion of the slides to control punching of a specific character will now be described. FIG. 5 illustrates the coaction between certain elements of the invention when it is desired that a coded representation of the letter "S" be punched into an output paper tape. For the purpose of this illustration, it is assumed that the coded representation of the letter "S" consists of a punch in the first channel and a punch in the fourth channel of a six-channel paper tape. The exploded view of FIG. 5 shows an interposer 18 and a stop member 12 in their operative positions. Six slides **30*a*–30*f*** are shown in their home or initial position; i.e., the slides are shown at an instant in time before any motion of slides has taken place. It must be kept in mind that vertical dimensions in FIG. 5 have been greatly exaggerated so that all details may be seen; the slides in the machine will normally be lying one directly on top of the other.

When the interposer 18 in FIG. 5 is moved to the right in its forward direction, the slides **30*a* and 30*d* will also be moved to the right, while the slides 30*b*, 30*c*, 30*e*, and 30*f* will remain stationary. After the "selected" slides 30*a* and 30*d* have been moved to the right to their operative positions, the output punch unit 6 (shown in FIG. 1) will be caused to punch the first and the fourth tracks of the output paper tape 4** resulting in a coded manifestation of the letter "S."

Because each slide is lying directly on top of the slide below it, there will be a frictional force between their contacting surfaces which opposes their relative motion. In the prior art, which used springs to move the slides, this frictional force would occasionally hold back a slide that should move, resulting in incorrect characters being punched or printed. Conversely, in the prior art, a slide that had been properly moved might be prevented by frictional forces from returning to its initial position.

Although frictional forces will still be present when this invention is used, FIG. 5 shows why they are no longer a problem. Clearly, when the interposer 18 moves to the right, the slides **30*a* and 30*d* will also be forced to move to the right. By the same token, the slides 30*b*, 30*c*, 30*e*, and 30*f* will not be dragged along by frictional forces because the detent portion 14 of the stop member 12 positively detains them from moving. When the interposer 18 moves back to the left after completion of a printing or punching cycle, the slides 30*a* and 30*d* will be forced to move back to their initial position and the slides 30*b*, 30*c*, 30*e*, and 30*f*** will again be positively detained from moving.

In the above description the motion of the stop member 12 from its original position to its operative position and back again was primarily vertical; that is, the detent portion 14 of a stop member 12 was shown to be above the stack of slides and outside of the stop openings 30 therein when the stop member was in its inoperative position. When a stop member was to move to its operative position, it would move downward so that its detent portion would enter the stop openings in the slides. This type of movement of the stop members is known as "vertical probing." Clearly, when the vertical probing technique is used, the vertical distance through which the stop member must move in order to enter its operative position will depend to some extent upon the number of slides in the stack.

Figure 7:
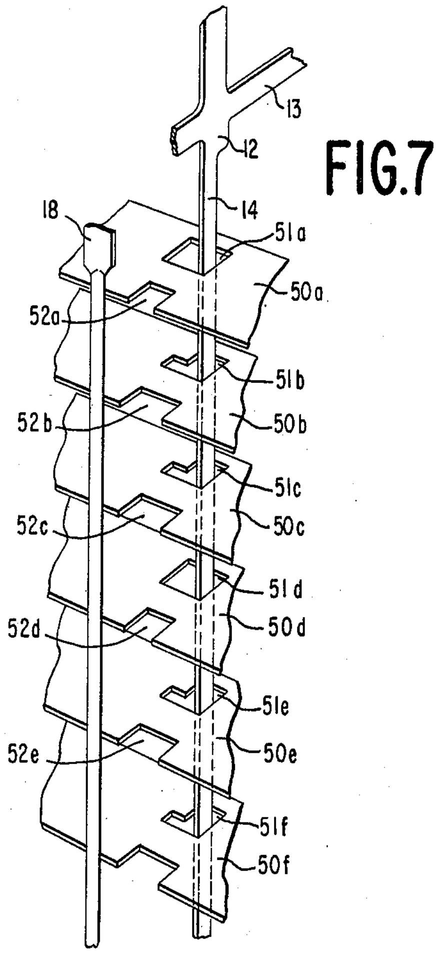
FIG. 7 is a detailed view similar to that of FIG. 5 but showing a variation of the manner in which slide movement may be controlled.

For this reason, it may be preferable to use the "horizontal probing" technique illustrated in FIG. 7. FIG. 7 shows a stack of slides **50*a*–50*f* in their home positions. The slides shown in FIG. 7 are similar to the slides shown in the other figures in all respects except for the shape of the stop openings 51*a*–51*f*. This difference is most clearly noticeable in the stop openings 51*b*, 51*c*, 51*e*, and 51*f*** that are contained in the slides which are to remain stationary when a character "S" is to be punched. Rather than being in the shape of rectangles, these last mentioned stop openings are shaped somewhat like a backward "L" for reasons to be explained below.

Another distinction between FIG. 7 and FIG. 5 is that, in FIG. 7, the interposer 18 and the stop member 12 are shown in their inoperative positions. FIG. 7 shows that the detent portion 14 of the stop member 12 extends through all of the stop openings in the stack of slides even though the stop member 12 is in its inoperative position. After the stop member is forced downward until its horizontal arm 13 falls below the level of the keeper 16 (see FIG. 2), the interposer 18 will move to its operative position and enter the engaging openings **52*a*–52*f*. As the interposer moves to its operative position, it will push the stop member 12 in a horizontal direction and move it to the rear of the stop openings 51*a*–51*f*. The stop member 12 will then also be in its operative position. When the stop member 12 has moved to its operative position, the detent portion 14 thereof will positively detain the slides 30*b*, 30*c*, 30*e*, and 30*f* against motion, without effecting the motion of slides 30*a* and 30*d*. When the "horizontal probing" technique is used, the vertical distance through which a stop member 12** must be moved is independent of the number of slides being used.

It will be understood that this invention embraces both the "vertical probing" and the "horizontal probing" technique, as well as others that might be used.

Figure 6:
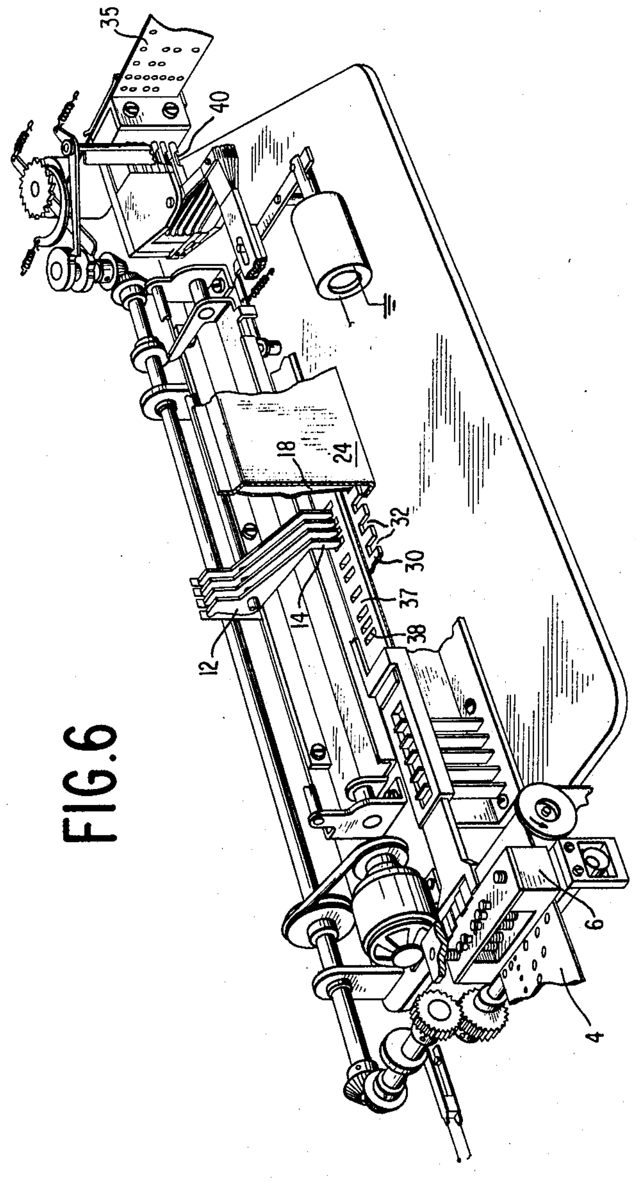
FIG. 6 is a view of a paper tape controlled device embodying the invention.

FIG. 6 shows another device, a paper tape controlled code converter, embodying the invention. This code converter is of the type described in the Hickerson patent 3,044,690, and reference is made to that patent for a more complete description of certain details of the device than will be included herein. The input to this machine is shown to be a prepunched paper tape 35. It is recognized that other forms of input; e.g., punched cards or telegraph signals could be used. The machine will accept the coded input and punch an output paper tape 4 with a coded representation of the input characters. The punches in the output paper tape may be different from the punches in the input paper tape. For example, the input might utilize five-channel code while the output is punched in six-channel code. Here again, it is recognized that the output of the machine could equally well be a printed character, a character punched into a tabulating card, or any other manifestation of the input.

The machine contains two groups of slides 37 and 30. The first group of slides 37 has openings 38 therein. These openings are just large enough to admit a sensing member 12 and are normally out of alignment when the slides are in their home positions. The second group of slides 30 has stop openings (not shown) and engaging openings 32 therein. The second group of slides is exactly the same as was described above in connection with a keyboard controlled device.

The input paper tape 35 is read by means of sensing pins 40 which fall through holes therein that are representative of a character. As is described in detail in U.S. Patent 3,044,690, a sensing pin 40 which falls through a hole in the input paper tape 35 will actuate the motion of an associated slide in the first group of slides 37. After slides in the first group have been moved in response to holes sensed in the input paper tape, there will be one set of holes 38 in alignment at an index point indicative of the character sensed. One of the sensing members 12 will then be permitted to fall through the set of aligned holes 38. Reference is again made to U.S. Patent 3,044,-690 for a detailed description of apparatus that may be used to control the motion of the sensing member. When the sensing member 12 falls through aligned holes 38 in the first group of slides 37, its detent portion 14 will also pass through a set of aligned stop holes 31 in the second group of slides 30. The detent portion 14 of the sensing member 12 serves the same purpose as the detent portion of the stop member described above and the motion of the slides in the second group 30 is controlled in the same manner as was described above in connection with FIG. 2. An interposer 18 associated with the sensing member 12 will enter a set of aligned engaging slots 32 in the second group of slides 30. The interposer will then be moved in its forward direction by a carrier unit 24 to move selected slides to their operative positions. A coded representation of the character sensed on the input paper tape 35 will be punched into the output paper tape 4 by the output punching mechanism 6 which cooperates with extensions 33 of the selected slides. The interposer 18 will then be moved in its reverse direction by the carrier unit 24 to return all slides 30 in the second group to their home positions. The interposer 18 and the sensing member 12 will then be returned to their initial positions, following which the first group of slides 37 will also be returned to the initial position. Finally, the input paper tape 35 will be advanced so that the next input character may be sensed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A data encoding machine comprising, in combination:

a plurality actuating means representative of various characters and machine functions;

a plurality of stop members each having a projecting portion and each of which is actuated by a unique one of said actuating means, each of said stop members responding to the actuation of a corresponding one of said actuating means by moving to its operative position;

a plurality of thin coded strips arranged closely adjacent to each other, each of which is movable longitudinally between a home position and an operative position;

each of said coded strips having a stop opening associated with each of said stop members, all of the stop openings associated with a given stop member being in alignment with each other when said coded strips are in their home position so that said projecting portion of each stop member can pass through each of said coded strips when the stop member is in its operative position;

predetermined ones of said stop openings being of such length that the projecting portion of a stop member received in one of said predetermined ones will prevent longitudinal motion of one of said coded strips, the remainder of said stop openings being of sufficient length that a projecting portion of a stop member received in one of said remainder will not prevent the movement of selected coded strips to their operaive position in accordance with encoded representation of a character;

a plurality of interposers each of which is repsonsive to the movement into its operative position of a unique corresponding one of said stop members, the responding motion of an actuated interposer is to move to its operative position;

associated with each of said interposers is an engaging opening on each of said coded strips, all of the engaging openings associated with a given interposer being in alignment with each other when said coded strips are in their home position so that said interposers can be moved to their operative positions;

predetermined ones of said engaging opening being of sufficient length that an interposer received in one of said predetermined ones of said engaging openings will be free to move in a longitudinal direction without moving unselected coded strips from their home position, remainder of said engaging openings permitting longitudinal movement of an interposer received in one of said remainder of said engaging openings to force the selected one of said coded strips to move to its operative position in accordance with a coded representation of a character;

drive means responsive to the movement of one of said interposer to its operative position to move the operative interposer in a longitudinal direction with respect to said coded strips;

whereby selected ones of said coded strips will be positively moved to their operative position.

2. The data encoding machine of claim 1 including:

character means operating in response to the movement of selected ones of said coded strips to their operative position for producing a manifestation of the actuating means that was actuated.

3. The data encoding machine of claim 2 including:

return drive means responsive to the completion of operation of said character means to move said interposer in a reverse longitudinal direction with respect to said strips;

whereby said coded strips will be reutrned to their home position.

4. The data encoding machine of claim 3 including:

disengaging means responsive to the operation of said return drive means to return to said one of said interposers to its inoperative position; and means responsive to the operation of said disengaging means to return to said one of said stop members to its inoperative position.

5. A data encoding machine comprising, in combination:

actuating means responsive to a character;

a stop member actuable by the actuating means to move to its operative position;

an interposer responsive to the movement of said stop member to its operative position by moving to its own operative position;

a plurality of coded strips each of which is movable between a home position and an operative position;

each of said strips having a coded first opening which receives said stop member when said stop member is in its operative position, and having a coded strip opening which receive said interposer when said interposer is in its operative position; and drive means responsive to movement of said interposer and said stop member to their operative position to move said interposer in a longitudinal direction with respect to said coded strips;

whereby selected ones of said coded strips will be positively moved to their operative position and unselected ones of said coded strips will be positively detained at their home position.

6. The data encoding machine of claim 5 including:

character means operated in response to the movement of selected ones of said coded strips to their operative position to produce a coded representation of said character.

7. The data encoding machine of claim 6 wherein:

said drive means is also responsive to the completion of operation of said character means to move said interposer in a reverse direction;

whereby said coded strips will be returned to their home position.

8. A data encoding machine comprising, in combination:

a plurality of actuating means representative to various characters and machine functions;

a plurality of stop members each having a projecting portion and each of which is actuated by a unique one of said actuating means, each of said stop members responding to the actuation of a corresponding one of said actuating means by moving to its operative position;

a plurality of thin coded strips arranged closely adjacent to each other, each of which is movable longitudinally between a home position and an operative position;

each of said coded strips having a stop opening associated with each of said stop members, all of the stop openings associated with a given stop member being in alignment with each other when said coded strips are in their home position so that said projecting portion of each stop member can pass through each of said coded strips when the stop member is in its operative position;

predetermined ones of said stop openings beign of such length that the projecting portion of a stop member received in one of said predetermined ones will prevent longitudinal motion of one of said coded strips, the remainder of said stop openings being of sufficient length that a projecting portion of a stop member received in one of said remainder will not prevent the movement of selected coded strips to their operative position in accordance with encoded representation of a character;

a plurality of interposers each of which is responsive to the movement into its operative position of a unique corresponding one of said stop members, the responding motion of an actuated interposer is to move to its operative position;

associated with each of said interposers is an engaging opening on each of said coded strips, all of the engaging openings associated with a given interposer being in alignment with each other when said coded strips are in their home position so that said interposers can be moved to their operative positions;

predetermined ones of said engaging openings being of sufficient length that an interposer received in one of said predetermined ones of said engaging openings will be free to move in a longitudinal direction without moving unselected coded strips from their home position, remainder of said engaging openings permitting longitudinal movement of an interposer received in one of said remainder of said engaging openings to force the selected one of said coded strips to move to its operative position in accordance with a coded representation of a character;

bi-directional means responsive to the movement of one of said interposers to its operative position to move said interposer in a longitudinal direction with respect to said coded strips;

character means operating in response to the movement of selected ones of said coded strips to their operative position for producing a manifestation of the character or machine function represented by the actuating means actuated;

said bi-directional drive means also being responsive to the completion of operation of said character means to move said interposer in a reverse longitudinal direction with respect to said coded strips;

whereby said coded strips will be returned to their home position.

9. The data encoding machine of claim 8 including:

disengaging means responsive to the reverse longitudinal motion of said bi-directional drive means to return the said one of said interposers to its inoperative position; and means responsive to the operation of said disengaging means to return the said one of said stop members to its inoperative position.

References Cited

UNITED STATES PATENTS

| | | | |
|---|---|---|---|
| 2,185,260 | 1/1940 | Lasker | 235—61.65 |
| 2,196,354 | 4/1940 | Colman | 197—1 |
| 2,323,824 | 7/1943 | Maschmeyer | 235—61.65 |
| 2,773,931 | 12/1956 | Kleinschmidt et al. | 178—33 X |
| 2,879,333 | 3/1959 | De Boo | 178—33 |
| 2,978,086 | 4/1961 | Hickerson | 197—16 |
| 3,044,690 | 7/1962 | Hickerson | 234—69 |
| 3,135,371 | 6/1964 | Young | 197—16 |

DARYL W. COOK, Primary Examiner

R. M. KILGORE, Assistant Examiner

U.S. Cl. X.R.

178—33; 197—16; 234—123